United States Patent [19]

Bennett, Jr.

[11] 3,882,460

[45] May 6, 1975

[54] SERIAL TRANSFER ERROR DETECTION LOGIC

[75] Inventor: Walter Scott Bennett, Jr., Diamond Bar, Calif.

[73] Assignee: Burroughs Corporation, Detroit, Mich.

[22] Filed: Nov. 2, 1973

[21] Appl. No.: 412,353

[52] U.S. Cl. .................................... 340/146.1 AG

[51] Int. Cl. ......................................... G06f 11/10

[58] Field of Search ........... 340/146.1 AG, 146.1 R, 340/172.5

[56] References Cited

UNITED STATES PATENTS

| | | | |
|---|---|---|---|
| 3,235,854 | 2/1966 | Nugent | 340/146.1 AG |
| 3,243,774 | 3/1966 | Betz | 340/146.1 AG |
| 3,763,470 | 10/1973 | Geng et al. | 340/146.1 AG |

OTHER PUBLICATIONS

C. E. Williams, Parity–Check Generate Circuit, IBM Tech. Discl. Bulletin, Vol. 12, No. 4, Sept. 1969, pp. 623.

T. G. Leary, Identifying Pluggable Unit on Parity Errors, IBM Tech. Discl. Bulletin, Vol. 11, No. 11, April 1969, pp. 1426–1427.

*Primary Examiner*—Charles E. Atkinson
*Attorney, Agent, or Firm*—Albin H. Gess; Nathan Cass; Kevin R. Peterson

[57] ABSTRACT

In a serial transfer channel, a single failing component may cause an even multiple of bit errors to occur in a message. By generating a parity bit for the overall parity of the contents of the transfer register, during information transfer, and using this overall parity bit to check the overall parity of the receive register, all error occurrences resulting from the failing component, including even multiple errors, are detected. Another embodiment detects all errors introduced during transfer of information to or from the transmission line by generating, at the receiving end and/or at the sending end, an intermediate parity bit for all information bits transferred from the transmission line to the receiving register and/or from the sending register to the transmission line.

20 Claims, 5 Drawing Figures

| TIME FRAME | Contents of Transfer Register P | $T_1$ | $T_2$ | $T_3$ | $T_n$ | Contents of Receive Register P | $R_1$ | $R_2$ | $R_3$ | $R_n$ | Exclusive OR (A) | Flip/Flop (Q) | Parity Check Bit (Z) |
|---|---|---|---|---|---|---|---|---|---|---|---|---|---|
| I ($t_1$ $t_2$ $t_3$ $t_4$ $t_5$ $t_6$) | 100000 | 110000 | 011000 | 101100 | 110110 | 011011 | 001101 | 000110 | 000011 | 000001 | 100100 | 010010 | 000000 |
| II ($t_1$ $t_2$ $t_3$ $t_4$ $t_5$ $t_6$) | 100000 | 110000 | 011000 | 101100 | 110110 | 000011 | 001001 | 000100 | 000010 | 000001 | 100100 | 010010 | 001111 |
| III ($t_1$ $t_2$ $t_3$ $t_4$ $t_5$ $t_6$) | 100000 | 110000 | 011000 | 101100 | 110110 | 010101 | 001010 | 000101 | 000010 | 000001 | 100100 | 010010 | 001011 |

FIG. 5

SERIAL TRANSFER ERROR DETECTION LOGIC

BACKGROUND OF THE INVENTION

The present invention relates generally to improvements in error detection in a serial transfer channel and more particularly pertains to a new and improved method and logic for detecting errors in a serial transfer channel wherein an error indication is generated every time a transfer error occurs.

The most critical problem confronting the developers and users of serial transfer channels has been the problem of establishing confidence in the information transferred. One of the simplest and most widely used error checking techniques in the art today is the well-known parity check. This parity check scheme is rather easily implemented when a parallel transfer channel is utilized and is quite effective in a parallel transfer channel. When a serial transfer channel is used, with present day computing apparatus which are generally parallel devices, the first stage of the transfer channel consists of a device that converts the message to be transferred from parallel to serial form. At the receiving end, the incoming serial message is converted, by another device from serial to parallel form. An example of a patent that utilizes a parity check scheme in such a serial transfer channel arrangement is U.S. Pat. No. 3,506,960. The parity check technique of this patent involves utilizing a one bit memory device such as a flip-flop or bistable multivibrator which is toggled by, for example, a binary one that is received in a message, thereby in effect, counting the binary ones in a message. If odd parity was being used, for example, the multivibrator must be toggled an odd number of times to present an indication that the message received is correct. This parity checking technique is effective for a serial transfer channel only if single or odd multiple errors occur in a particular message. However, this technique would be unable to detect the occurrence of even multiple errors in a particular message.

Another technique employed by the prior art to check the operation of serial transfer channels, an example of which can be found in U.S. Pat. No. 3,531,631, involves the use of applying test data to the serial transfer channel and observing its function in response thereto. The response of the serial transfer channel to this test data, if the transfer channel is operating correctly, is known. This known response is compared to the actual response, a difference obviously indicating that the transfer channel is not working correctly. A drawback of this technique is that all transfer of data must be halted while the transfer channel is being stimulated by the test data.

Yet another prior art technique for error checking messages transferred on a serial transfer channel, an example of which may be found in U.S. Pat. No. 3,562,711, involves the use of shift register circuitry constructed with certain feed-back loops that encode the message to be transmitted with check bits. Such an encoded message is then operated on by a generator polynomial at the receiving end, either dividing or multiplying the generator polynomial with the received message to cause an indication of error or lack of error in the received message. This type of checking scheme is effective in detecting the occurrence of many odd and even multiple errors but requires use of shift registers and polynomial generating hardware, which is expensive. Another shortcoming, as explained in the U.S. Pat. No. 3,562,711, is that the receiving apparatus that causes the receiving message to be multiplied or divided by the polynomial is not checked by this process and may introduce errors that can go undetected. To compensate for this shortcoming, as taught by this patent No. 3,562,711, additional parity checking hardware must be provided at the receiving end of the message to ensure that the receiving shift register and polynomial generating hardware is not in error.

SUMMARY OF THE INVENTION

An object of this invention is to provide effective and uncomplicated error detection logic for a serial transfer channel.

Another object of this invention is to provide uncomplicated error detection logic for a serial transfer channel that detects each occurrence of odd and even multiple errors.

Still another object of this invention is to provide uncomplicated error detection logic for a serial transfer channel that detects odd and even multiple errors and facilitates identification of the error source.

These objects and the general purpose of this invention are accomplished by generating parity bits that represent the overall parity of the transfer registers at each transfer cycle during information transfer or by generating and storing an intermediate parity bit with each information bit transferred and comparing that parity bit with the next bit received by the receiving register during an information transfer cycle. When the overall transfer register parity is generated at the transmitting end of a serial transfer channel, a path separate from that of the information bits is provided for these parity bits. When intermediate parity bits representing the parity of information bits still in the sending register are generated at the transmitting end and intermediate parity bits representing the parity of information bits so far received by the receiving register are generated at the receiving end, a separate path for these intermediate bits is not required. Whether using overall parity bits or intermediate parity bits, a parity checking circuit combines the parity bits with the information bits in the receive register at each transfer cycle. The output of the receive register parity checking circuit will change every time there is a detectable error.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 5 is a state diagram showing the operation of FIG. 4 for three examples.

DESCRIPTION OF THE PREFERRED EMBODIMENTS

Figure 1:
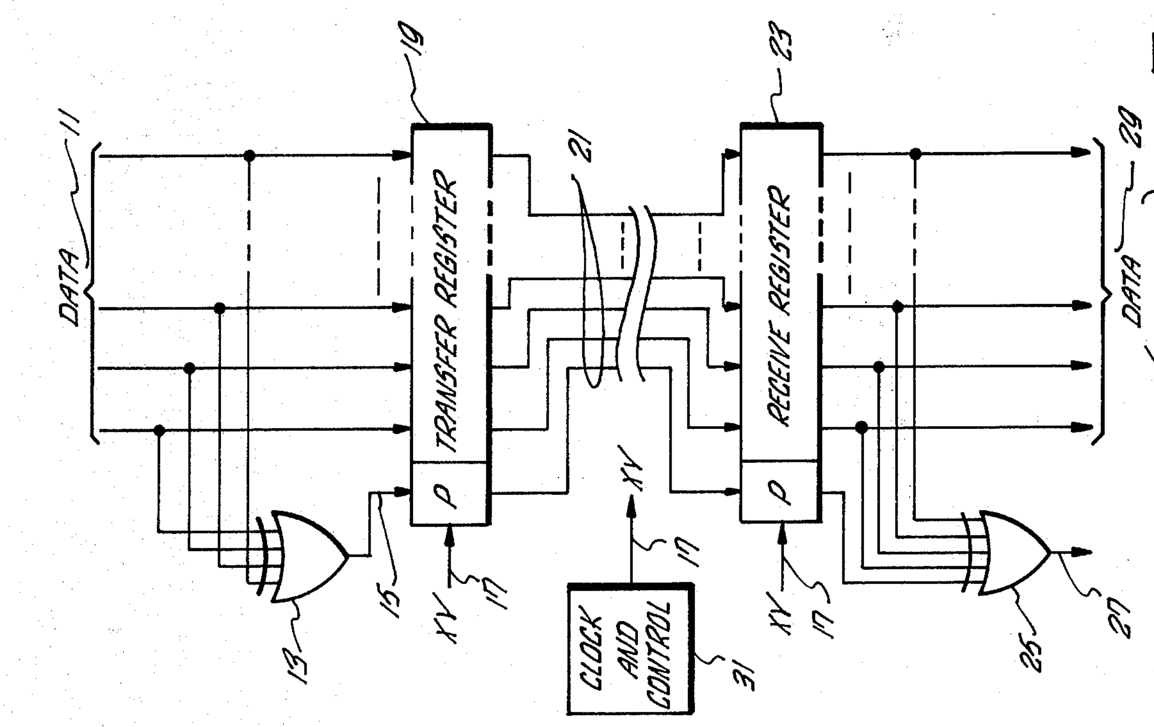
FIG. 1 is a block diagram representation of a prior art parity error checking circuit for a parallel transfer channel.

Referring first to FIG. 1, which illustrates in block diagram form a prior art parity error checking circuit for parallel transfer channels, a parallel input, parallel output transfer register 19 receives data on parallel input lines 11 and in response to clock and other control signals XY on line 17 from clock and control circuitry 31 transfers its information over the parallel transfer channel 21, which consists of a separate path for each bit transferred, to the receive register 23. This receive register receives the data from lines 21 under the control of clock and control signals XY on line 17 from clock and control source 31. Upon reception of the signals, receive register 23, transfers the information within it over parallel output lines 29 to other equipment, in response to clock and control signals XY received on line 17.

In order to ensure that the message received by transfer register 19 over parallel data lines 11 is correctly transferred from transfer register 19 to receive register 23 and from receive register 23 to subsequent equipment, a parity generating circuit 13, which is shown to be a multiple input Exclusive OR gate is utilized to generate an even parity condition for each message that is transferred from register 19 to register 23. This is accomplished by Exclusive OR gate 13, generating a binary one on line 15 and inserting it into the parity bit position of transfer register 19 every time the modulo-two sum of the binary ones in the message received on parallel input lines 11 is an odd multiple. The addition of a single binary one to an odd multiple of binary ones produces an even multiple of binary ones. If the message received at the receive register 23 has been received without error the parity checking circuit 25 which is also a multiple input Exclusive OR gate, generates a binary zero at its output 27 in response to an even multiple of binary ones in the received message. If an error had occurred in one bit, or in any odd multiple of bits, the sum of binary ones in the received message, stored in receive register 23 would be an odd multiple, thereby causing the parity check circuitry 25 to generate a binary one. This, of course, is an indication that an error has occurred. Because a parallel transfer channel from transfer register 19 to receive register 23 is utilized, the occurrence of even multiple errors in a single transmission cycle has a very low probability of occurrence, since each bit of a message is transferred over its own or separate path. For an even multiple of errors to occur, for example, two flip-flops, in either the transfer register or the receive register, would have to fail at the same time. This is a much rarer occurrence than the failure of a single flip-flop. Thus, this type of parity error checking scheme is quite effective and very inexpensive to implement for a parallel transfer channel. This is not the case, as will be henceforth explained, for a serial transfer channel.

Figure 2:
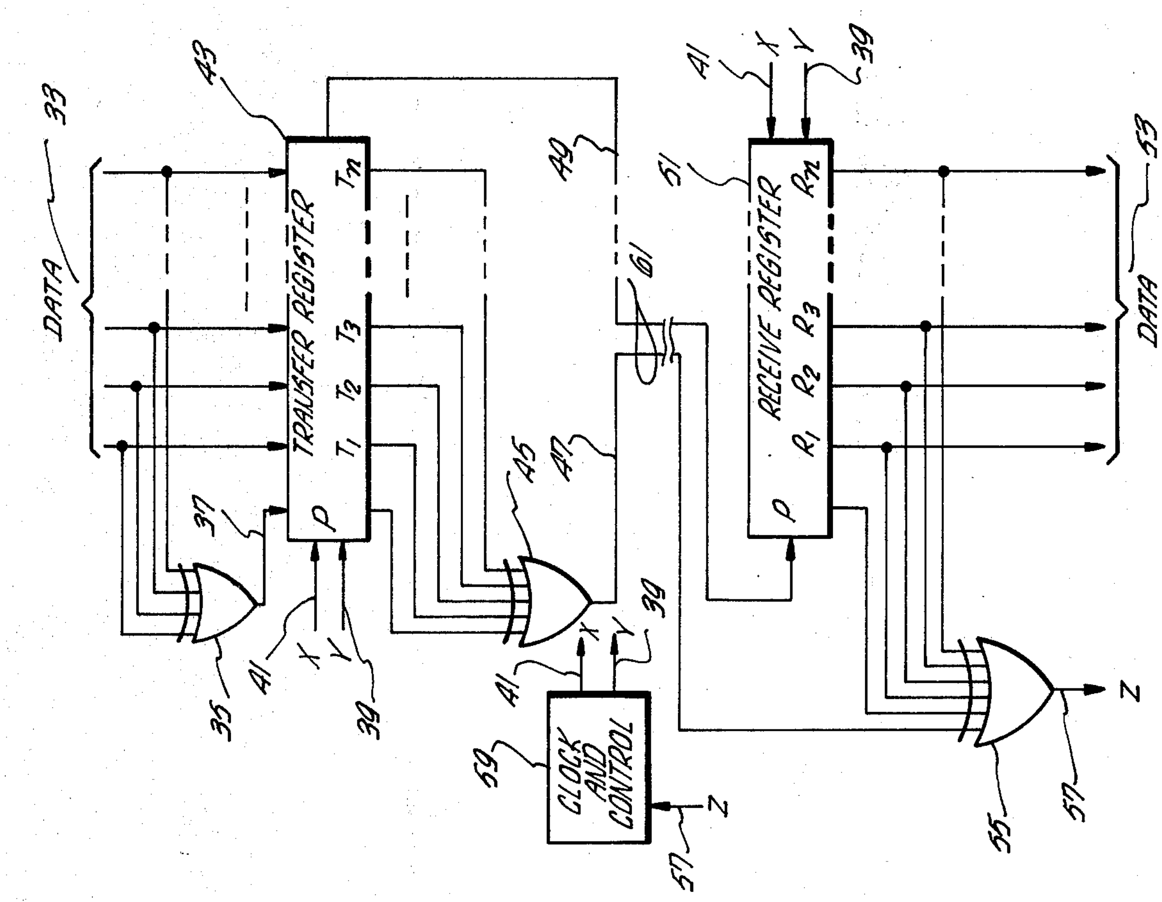
FIG. 2 is a block diagram representation of a preferred embodiment of a parity error checking circuit for a serial transfer channel according to this invention.

Referring now to FIG. 2, a serial transfer channel is shown with a preferred embodiment of the parity error checking circuitry according to this invention. In order to simplify the explanation of the structure and workings of this invention, a complete two-way serial communication path between data processing equipment has not been shown. For example, FIG. 2 only illustrates half of a duplex communication path. That is, data can only be transferred from one place to another in a single direction. To go in a reverse direction requires a duplication of the apparatus shown in FIG. 2 or some multiplex equipment. The serial transfer channel of FIG. 2 is made up of a transfer register 43 receiving data bits over parallel input lines 33 and transferring the data bits serially, one bit at a time, over serial transfer line 49 to receive register 51 which receives the transfer bits one at a time. As the receive register 51 receives the transferred message one bit at a time from the transfer line 49, the states of the flip-flops that make up the receive register 51 are sensed by the output lines 53. However, the entire message has not been received until the receive register 51 is full, whereupon the signals on the parallel data lines 53 contain the message in parallel. At this time the receive message is transferred to, perhaps, another buffer register or the utilizing equipment.

The transfer register 43 is a, well known in the art, parallel input, serial output shift register that responds to clock signals X on line 41 from a clock and control source 59 and to control signals Y on line 39 from the same clock and control source 59. An example of a ten bit parallel input, serial output register that may be utilized for this invention can be found in the Signetics catalog for digital 8000 series TTL-MSI chips, page 111, denoted 8274 Ten Bit Shift Register. This particular shift register in addition to the clock inputs responds to two other control signals which cause the following operating modes: HOLD, CLEAR, LOAD, and SHIFT.

The receive register 51 of FIG. 2 may take the form of a ten bit serial input, parallel output shift register described in the same digital 8000 series TTL-MSI Signetics catalog, page 109, this shift register being denoted 8273 Ten Bit Shift Register. In addition to clock signals, this shift register responds to a reset command.

The clock and control circuitry needed to accomplish the function of the clocking control box 59 of FIG. 2 is seen as well within the purview of a person of ordinary skill in the art. Since it does not constitute a part of the present invention, no further explanation other that its functional description will be provided. The generation of a system clock and other timing control signals, is well known to those in the computer arts.

A parity bit is generated by a parity generating circuit 35 which is a multiple input Exclusive OR gate. This parity bit is inserted into the transfer register 43 over line 37. As was explained in relation to the prior art parity generating circuit of FIG. 1, this parity bit is generated to maintain even parity in the message transferred. The parity generating circuit 35 of FIG. 2 performs a function that is equivalent to the parity generating circuit 13 of FIG. 1. As the message stored in the transfer register 43 is transferred bit by bit to the receive register 51 over the data transfer line 49 of the serial transfer channel 61, another parity generating circuit 45 which is also a multiple input Exclusive OR gate 43, generates an overall parity bit reflecting the parity of the bits in the transfer register at each transfer time or cycle. This overall parity bit is transmitted from the overall parity bit generating circuit 45, by way of a separate parity line 47 that is part of the serial transfer channel 61, to the parity checking circuit 55, at the receiving end of the transfer channel. As each bit of the message is being clocked into the receive register 51, the parity checking circuit 55, which is a multiple input Exclusive OR gate, generates an overall parity check of the contents of the receive register at each transfer cycle, in response to its contents and the overall parity bit generated. The exact function of the structure of FIG. 2 will be hereinafter explained in connection with FIG. 3. Suffice it to say at this time, if the data bits being supplied to the receive register 51 are not in error the output Z of the parity checking circuit 55 on line 57 will remain a constant binary 1 or binary 0. If, however, a bit error occurs, the output Z on line 57 of the parity checking circuit 55 will change thereby indicating that the just received bit is incorrect or that an already received bit was changed in shifting from one position to the next in the receive register 51. This indication may be sent back to the clock and control circuitry 59 to stop transmission of data. By knowing the original contents of the transfer register 43, the exact flip-flop of the transfer register causing the error may be identified. Exactly how this is done will be subsequently explained in connection with FIG. 3. Stopping of the transmission is just an example of how the error indication may be utilized, in a data communication system and should not be considered as limiting.

Figure 3:
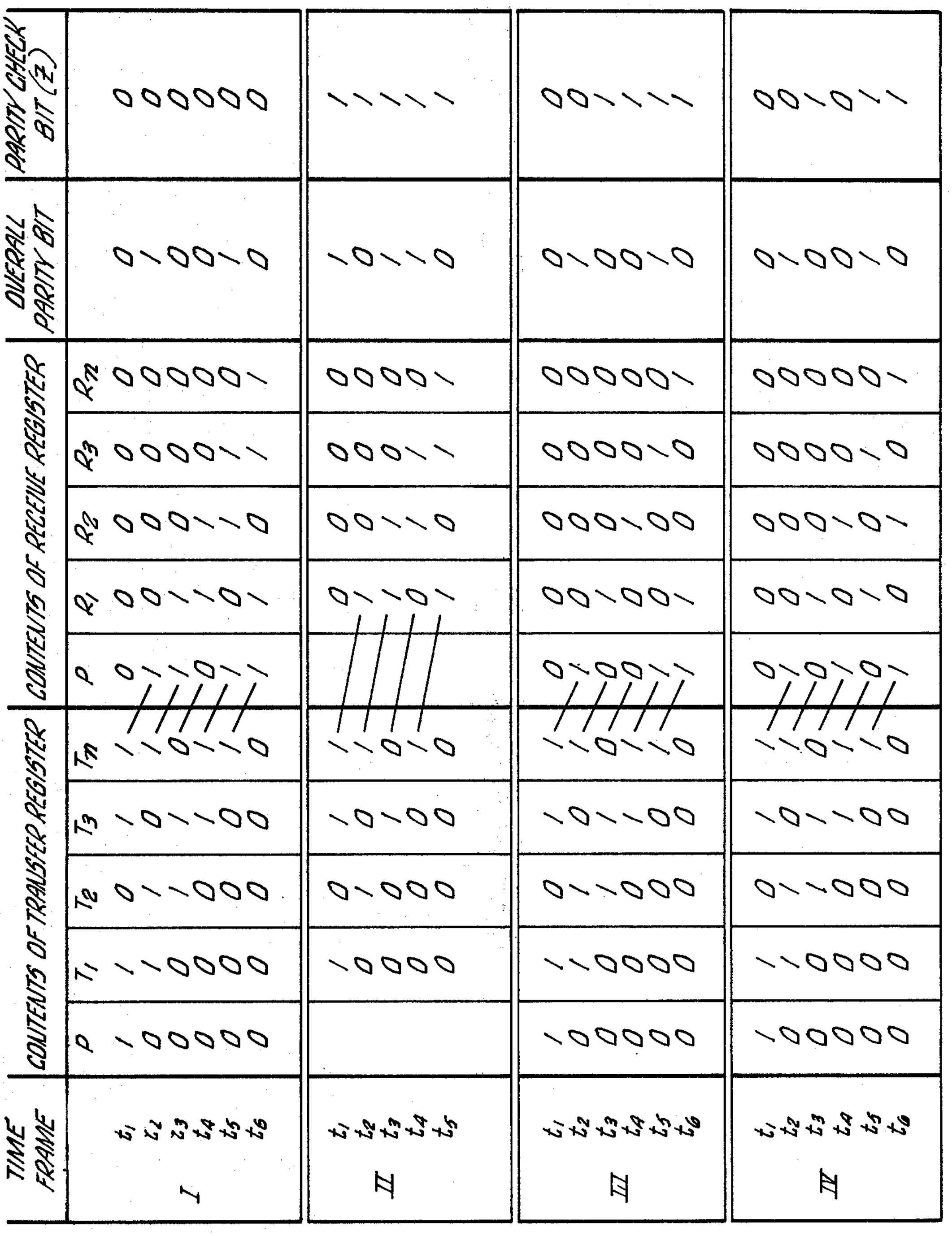
FIG. 3 is a state diagram of the operation of the structure of FIG. 2 for four examples.

FIG. 3 is a state diagram illustrating the operation of the embodiment of the invention of FIG. 2, for four separate message transfers. Transfer register 43 and receive register 51 of FIG. 2 are shown to have an extra bit position for a parity bit which is generated by parity generating circuit 35 at the transfer end of the channel. This invention, however, is not limited to the specific embodiment shown in FIG. 2. The parity bit placed into the transfer register 43 need not be used, and is not necessary to the functioning of this invention. If the parity bit is not included, the embodiment of FIG. 2 would not need the parity bit generator 35, the extra bit positions in the transfer and receive registers, the extra parity bit input to the overall parity generating circuit 45 and the extra parity bit input to the parity checking circuit 55. The embodiment of FIG. 2 was drawn in the manner shown, including the extra parity bit, because it is standard practice in the computer arts to include a parity bit with each transfer message, and such inclusion does not hinder the operation of this invention.

Referring now to the first example of FIG. 3, identified by I, the data message 1 0 1 1 is inserted in transfer register 43 at clock time $t_1$. It should be understood that the transfer register 43, and the receive register 51, for that matter, is not limited to the bit length of 5. Even though it is shown as a 5 bit length register, any desirable length register may be used in the embodiment. At the same time that the data message 1 0 1 1 is transferred into the transfer register 43 a parity bit 1 is generated by parity generating circuit 35 and inserted into the parity bit position of transfer register 43. The transfer register 43, at time $t_1$, has a binary content of 1 1 0 1 1. In response thereto, the overall parity generating circuit 45 generates an overall parity bit of 0 and transmits it to the parity checking circuit 55 over line 47. Still at time $t_1$, overall parity bit 0 plus the contents of the receive register 51, which has not received a data bit yet, produces a parity check bit on line 57 of 0. At time $t_2$ the content of the transfer register 43 is shifted right one position to leave a content of 0 1 1 0 1. This right shift operation causes the contents of the receive register to change to 1 0 0 0 0. During the same clock time, the overall parity bit generated by the parity generating circuit 45 in response to the new contents of the transfer register is a binary 1 that is combined with the new contents of the receive register, in error check circuit 55, to generate a parity check bit that is a binary 0. This continues for another four clock times $t_3$, $t_4$, $t_5$, and $t_6$, at which time the contents of the transfer register are all 0's indicating that a complete message has been transmitted to the receive register which now contains 1 1 0 1 1. This, of course, is identical to the data bits plus parity bit originally in the transfer register. As can be seen from the parity bit column of FIG. 3, the output Z of the parity checking circuit 55 did not change. This is so because no errors occurred during the transfer.

Referring now to example two of FIG. 3, denoted by II, the same data message 1 0 1 1 as was transmitted in example one is utilized. However, as can be seen, the parity bit is not made part of the transfer message. As noted earlier, by not using the parity bit as part of the transfer message, some hardware may be eliminated. As can be seen from example two which illustrates an error-free serial transmission, the parity check bit generated by the parity checking circuit 55 on line 57 does not change from a binary 1. It should be understood that the error indication is a change from either a binary 0 or a binary 1. The direction of change is irrelevant, the change itself being the error indicator.

Referring now to example three of FIG. 3, denoted as III, the same data word 1 0 1 1 as illustrated in example one is again utilized for transmission. However, in this example, it is assumed that at clock time $t_3$, a binary one is placed on the serial transfer line 49 and a binary 0 is received by the receive register 51. Obviously, this is a transfer error which in the manner above explained results in a change of the parity check bit Z generated by the parity checking circuit 55. Thus, at time $t_3$, the parity check bit changes to a binary 1 from a binary 0 which was generated at clock times $t_1$ and $t_2$. If in response to this change the transfer clock was stopped, thereby stopping all data transfer, the contents of the transfer register would be 0 0 1 1 0. From the contents of the transfer register during this clock period and also from knowing the number of transfers that had preceded the stop command, the bit in error may be conveniently identified. For example, from the contents of the transfer register, it is clear that the second bit from the right in the original message is in error. This erroneous bit is in the left-most position of the receive register at time $t_3$. At time $t_3$ the receive register reads 0 1 0 0 0. Obviously, therefore, the first 0 is wrong and should be a binary 1. For the remainder of this example, it has been assumed that no further errors occurred. The parity check bit generated by the parity checking circuit 55, therefore, does not change.

Referring now to example four of FIG. 3, denoted as IV, the same data word 1 0 1 1 as in all the previous examples is again used. In this example, however, a plurality of error occurrences is illustrated. At time $t_3$ a binary 1 is placed on the transfer line 49 but a binary 0 is received. This causes the parity check bit Z to change from a binary 0 to a binary 1. At $t_4$ a 0 is transmitted but a binary 1 is received. This causes the parity check bit Z to change from a binary 1 to a binary 0. At $t_5$ a binary 1 is transmitted but a binary 0 is received. This causes the parity check bit Z to change from a binary 0 to a binary 1. At $t_6$ no errors occur, therefore, the parity check bit remains a binary 1.

Figure 4:
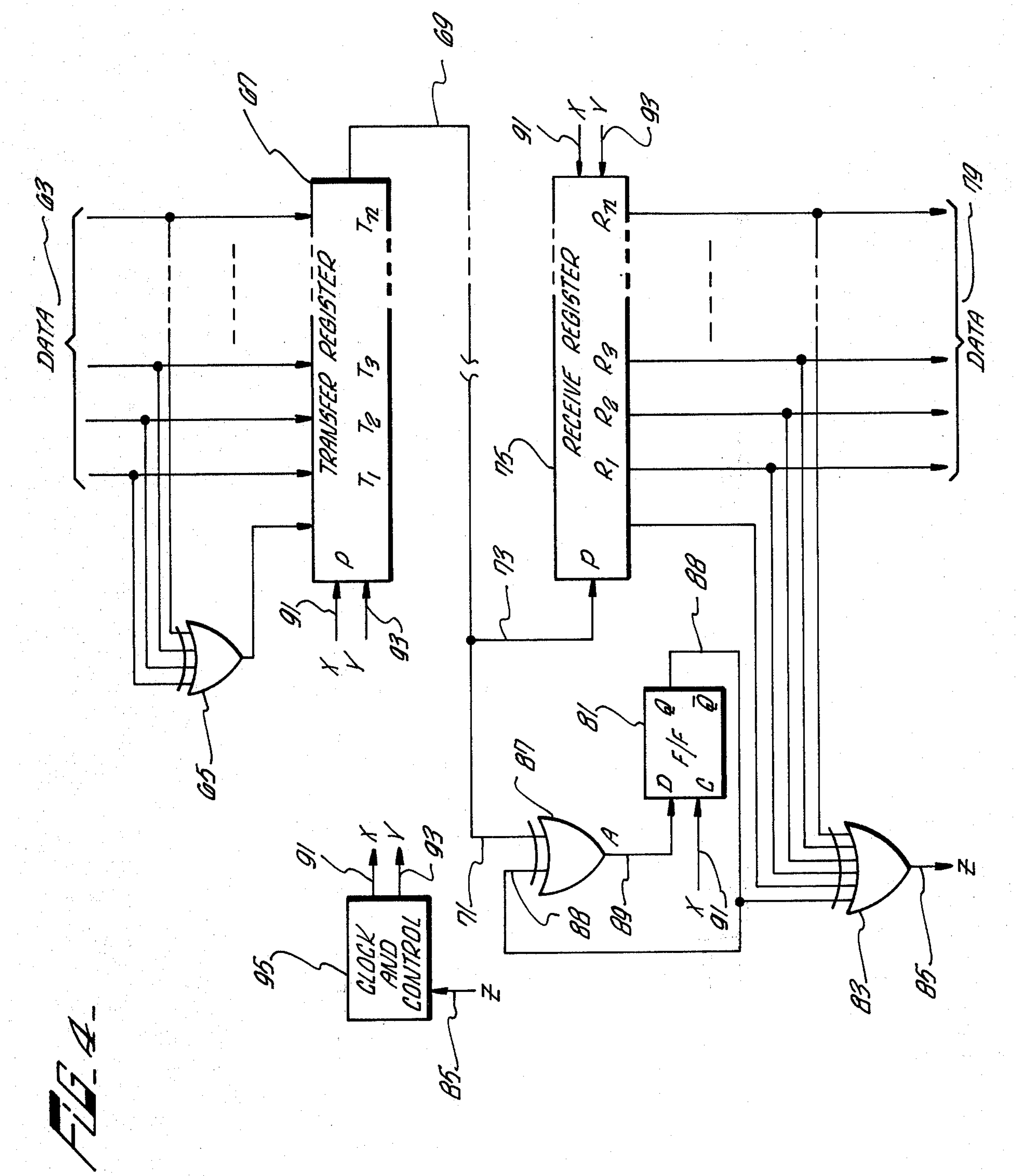
FIG. 4 is a block diagram of a parity error checking circuit that is another preferred embodiment of this invention.

Referring now to FIG. 4, which also illustrates a preferred embodiment of the present invention, it can be seen that a major portion of the components thereof are the same as the embodiment of FIG. 2. The like elements are a clock and control circuitry 95 having clock output X on line 91, control outputs Y on line 93, and parity check bits Z as inputs on line 85. Also, the parity generating circuit 65 inserting parity bits in the transfer register 67, as well as the parity checking circuit 83 generating the parity check bit Z on line 85 are the same. Here again, it should be remembered that the parity generating circuit 65 may be dispensed with since it is not necessary to this invention. It is being shown for reasons mentioned earlier. The data bits to be transferred are inserted into a parallel input, serial output transfer register 67 over parallel input lines 63. The bits are serially shifted out of the transfer register 67 onto a serial transfer line 69 from where they are inserted into the receive register 75 over line 73 and at the same time supplied as an input to Exclusive OR gate 87, over line 71. The obvious difference between the embodiment of FIG. 2 and FIG. 4 is that the embodiment of FIG. 4 only requires a single transfer line whereas the embodiment of FIG. 2 required two transfer lines, one for data and one for the overall parity bit. Also, as can be seen from FIG. 4, no overall parity bit generating circuit is utilized.

The parity checking circuit 83 is a multiple input Exclusive OR gate that generates a parity check bit Z on line 85. In addition to the parallel data output 79 of the receive register 75, the parity checking circuit 83 receives the Q output of a D-type flip-flop 81 over line 88. The D-type flip-flop 81 is well known in the art to transfer a binary data bit applied at its D input every time a clock signal X is received over line 89 at its C input. If a parity bit is desired as part of the transfer message, it is also supplied to the parity checking circuit 83.

The parity checking circuit 83 checks the parity contents of the receive register 75 during each transfer cycle under the influence of the bit supplied to it by the D-type flip-flop 81 over line 88. This bit represents what may, for convenience, be called an intermediate parity bit. The Exclusive OR gate 87 and the D-type flip-flop 81 generate this intermediate parity bit.

This intermediate parity bit represents a comparison between the last data bit received and intermediate parity bit generated as a result of the immediately previous data bit being received. The first intermediate parity bit generated upon the reception of the first binary bit in the message is generated with reference to binary 0. This is a matter of design choice and should not be considered as limiting the invention since the reference could also be a binary 1 depending upon which output, Q or $\overline{Q}$, of the D-flip-flop 81 is used.

The exclusive OR gate 87 thus essentially generates the modulo two sum of a data bit received from the transfer register 67 at this clock time over line 71 and the previous intermediate parity bit stored in D-type flip-flop 81 and supplied to the Exclusive OR gate 87 over line 88. The result A, on line 89, which is the new intermediate parity bit, is supplied to the D input of D flip-flop 81 where it is stored awaiting the next transmitted data bit. At the same time that the Q output of the flip-flop 81 is being supplied to Exclusive OR gate 87, it is being supplied to the parity checking circuit 83 which, in the same manner as was explained in connection with FIG. 2, generates a parity check bit Z on line 85.

Referring now to FIG. 5 and three examples of a transmission of a data word in the embodiment of FIG. 4, it is again assumed that the transfer and receive registers are 5 bit registers. However, this should not be considered as limiting since any length register may be used. Referring first to example I, assume that the data word 1 0 1 1 is supplied to the transfer register 67 over data lines 63 at time $t_1$. A parity bit which is a binary 1 will be generated by the parity generating circuit 65 and inserted into the parity bit position of the transfer register 67 in response thereto. At time $t_2$ the contents of the transfer register are shifted right by one position causing binary 1 to be shifted into the receive register 75 causing the contents of the receive register 75 to be 1 0 0 0 0. At the same time the output A on line 89 of Exclusive OR gate 87, in response to reception of the binary 1 and the previous output Q of the flip-flop 81, becomes binary 1, thereby causing the Q output of flip-flop 81 to change to a binary 1. This binary 1 is supplied over line 88 to the parity check circuit 83. In response to the plurality of inputs to the parity check circuit 83, it generates a parity check bit Z which is a binary 0. This parity check bit Z is generated in response to receiving a total of binary 1's from the receive resister 65 and the flip-flop 81 that is an even multiple. This transfer operation continues for four more clock times until $t_6$ at which time the contents of the transfer register 65 are empty and the contents of the receive register 75 are full and identical to what the contents of the receive register 75 were at the start of transfer. As can be seen from the parity check bit column, the parity check Z generated by the parity check circuit 83 did not change thereby indicating that no error occurred.

Referring now to the second example, denoted by II, in FIG. 5 the same binary data word as was used in example one is used. However, in this illustration at time $t_3$ a binary 1 is transferred, but a binary 0 is received. This, of course, is an error which is indicated by the parity check bit Z on line 85 changing from a binary 0 to a binary 1. Since the remainder of the transfer cycle does not generate any errors the parity check bits subsequently generated by the parity check bit circuit 83 on line 85 do not change.

Referring now to the third example, denoted by III, in FIG. 5 the same binary word 1 0 1 1 including a parity bit of binary 1 is used again. In this example, however, the occurrence of three transfer errors has been assumed. The first transfer error occurs at time $t_3$ causing the parity check bit Z on line 85 to change from a binary 0 to a binary 1. The second transfer error occurs at time $t_4$ causing the parity check bit to change from a binary 1 to a binary 0. The third transfer error occurs at time $t_5$ causing the parity check bit to change from a binary 0 to a binary 1. At time $t_6$ no transfer error occurred, thereby the parity check bit remains a binary 1.

As was stated in connection with the embodiment of FIG. 2, the parity check bits Z generated by the parity check circuit 83 on line 85 may be supplied to the clock and control circuitry 95 to stop transfer of information upon a change occurring in the check bit pattern thereby facilitating identification of the bit error and the flip-flop of the receive register in error, since the bit error is known. If it is desired to monitor the transmitting end of the channel for errors, circuitry equivalent to the Exclusive OR gate 87, flip-flop 81, and Exclusive OR gate 83 must be connected to the transmitting end of the channel, at the output of transfer register 67.

In summary then, it is seen that an effective and uncomplicated error detection circuit for serial transfer channels has been provided that can detect the occurrence of the even or odd multiple errors generated by a single source, and identifies the particular bit in the message that is in error. It should be understood, of course, that the foregoing disclosure only relates to a preferred embodiment of the invention and that numerous modifications may be made therein without departing from the spirit and scope of the invention as set forth in the appended claims.

What is claimed is:

1. Error detection logic for a serial transfer channel having a single transmission path and utilizing a parallel input, serial output transfer register at one end and a serial input, parallel output receive register at the other end, comprising:

means for generating an overall parity bit in response to all the bits in said transfer register during each transfer cycle;

means for checking parity of all the bits in said receive register during each transfer cycle in response to the bits in said receive register and the overall parity bits received from said overall parity bit generating means; and means for transferring the overall parity bits from said parity bit generating means to said parity checking means separately from the bits in said transfer register.

2. The error detection logic of claim 1 wherein said parity bits transferring means, comprises:

a separate transmission path in said serial transfer channel for transmitting said overall parity bits from said overall parity bit generating means to said parity checking means.

3. The error detection logic of claim 2 wherein said means for generating an overall parity bit, and said means for checking parity are multiple input Exclusive OR gates.

4. Error detection logic for a serial transfer channel wherein a message consisting of a plurality of binary information bits is transferred from one location to another over the same communication path one bit at a time, comprising:

means for generating a plurality of overall parity bits, each of said parity bits being determined by the character of a particular one or more of said information bits which particular bits are in turn determined by the order of serial transmission of the information bits constituting said message;

means for checking parity of said message at a receiving location, said parity checking means performing a plurality of parity checks for each received message, each parity check being responsive to a particular one of the overall parity bits and to a particular one or more of the received information bits constituting said message as determined by the order of serial reception thereof; and means for transferring the overall parity bits from said parity bit generating means to said parity checking means separately from the bits in said communication path.

5. The error detection logic of claim 4 wherein said overall parity bits transferring means comprises:

a transmission path separate from said communication path.

6. The error detection logic of claim 5 wherein said means for generating overall parity bits, and said means for checking parity are multiple input Exclusive OR gates.

7. A method for detecting error occurrences in a serial transfer channel having a single transmission path and utilizing a parallel input, serial output transfer register at one end and a serial input, parallel output receive register at the other end, comprising:

generating an overall parity bit at said one end in response to all the bits in said transfer register during each transfer cycle;

transferring the overall parity bits generated to said other end of the single transmission path separately from the bits in said transfer register; and parity checking at said other end all the bits in said receive register during each transfer cycle in response to the bits in said receive register and the overall parity bits received.

8. A method for detecting error occurrences in a serial transfer channel wherein a message consisting of a plurality of binary information bits is transferred from one location to another over the same communication path one bit at a time, comprising:

generating overall parity bits at said one location, said parity bits being determined by the character of a particular one or more of said information bits which particular bits are in turn determined by the order of serial transmission of the information bits constituting said message;

transferring the overall parity bits generated to said another location separately from said information bits; and checking parity of said message at said another location, said parity checking performing a plurality of parity checks for each received message, each parity check being responsive to a particular one of the received overall parity bits and to a particular one or more of the received information bits constituting said message as determined by the order of serial reception thereof.

9. Error detection logic for a serial transfer channel having a single transmission path and utilizing a parallel input, serial output transfer register at one end thereof and a serial input, parallel output receive register at the other end thereof, comprising:

means for generating an intermediate parity bit during each transfer cycle for each bit transferred on said serial transfer channel; and means for checking parity of all the bits in said receive register during each transfer cycle in response to the bits in said receive register and the intermediate parity bit received from said intermediate parity bit generating means.

10. The error detection logic of claim 9 wherein said intermediate parity bit generating means is situated at the receive register end of said serial transfer channel.

11. The error detection logic of claim 10 wherein said means for generating an intermediate parity bit; comprises:

a two input Exclusive OR gate having one of its inputs connected to the output of said transfer register; and a D-type flip-flop having its input driven by the output of said OR gate and its output connected to the other input of said OR gate.

12. The error detection logic of claim 9 wherein said means for generating an intermediate parity bit, comprises:

a two input Exclusive OR gate having one of its inputs connected to the output of said transfer register; and a D-type flip-flop having its input driven by the output of said OR gate and its output connected to the other input of said OR gate.

13. Error detection logic for a serial transfer channel wherein a message consisting of a plurality of binary information bits is transferred from one location to another over the same communication path one bit at a time, comprising:

a binary storage means;

means for generating intermediate parity bits, each of said intermediate parity bits being determined by the character of each information bit transferred on said serial transfer channel and the output from said binary storage means, each newly generated intermediate parity bit being loaded into said storage means to be read out at the next information bit transfer; and means for checking parity of said message at said another location, said parity checking means being responsive to the information bits in said message and to the intermediate parity bits.

14. The error detection logic of claim 13 wherein said intermediate parity bit generating means and said storage means is situated at said another location of said serial transfer channel.

15. The error detection logic of claim 14 wherein said means for generating an intermediate parity bit, comprises:

a two input Exclusive OR gate having one of its inputs connected to said serial transfer channel; and a D-type flip-flop having its input driven by the output of said OR gate and its output connected to the other input of said OR gate.

16. The error detection logic of claim 13 wherein said means for generating an intermediate parity bit, comprises:

a two input Exclusive OR gate having one of its inputs connected to said serial transfer channel; and a D-type flip-flop having its input driven by the output of said OR gate and its output connected to the other input of said OR gate.

17. A method for detecting error occurrences in a serial transfer channel having a single transmission path and utilizing a parallel input, serial output transfer register at one end and a serial input, parallel output receive register at the other end, comprising:

generating an intermediate parity bit during each transfer cycle, said intermediate parity bit being determined by the character of the bit transferred on said serial transfer channel and the character of the immediately previous intermediate parity bit; and checking parity of all the bits in said receive register during each transfer cycle in response to the bits in said receive register and the generated intermediate parity bits.

18. A method for detecting error occurrences in a serial transfer channel wherein a message consisting of a plurality of binary information bits is transferred from one location to another over the same communication path one bit at a time, comprising:

generating intermediate parity bits, each of said intermediate parity bits being determined by the character of each bit transferred on said serial transfer channel and the character of the immediately previous intermediate parity bit; and checking parity of said message at a receiving location, said parity checking being responsive to the information bits in said message and to the intermediate parity bits.

19. Error detection logic for a serial transfer channel wherein a message consisting of a plurality of binary information bits is transferred from one location to another over the same communication path one bit at a time, comprising:

a binary storage means;

means for generating intermediate parity bits, each of said intermediate parity bits being determined by the character of each information bit transferred on said serial transfer channel and the output from said binary storage means, each newly generated intermediate parity bit being loaded into said storage means to be read out at the next information bit transfer; and means for checking parity of said message at said one location, said parity checking means being responsive to the information bits in said message and to the intermediate parity bits.

20. Error detection logic for a serial transfer channel wherein a message consisting of a plurality of binary information bits is transferred from one location to another over the same communication path one bit at a time, comprising:

a binary storage means;

means for generating intermediate parity bits, each of said intermediate parity bits being determined by the character of each information bit transferred on said serial transfer channel and the output from said binary storage means, each newly generated intermediate parity bit being loaded into said storage means to be read out at the next information bit transfer;

means for checking parity of said message at said one location, said parity checking means being responsive to the information bits in said message and to the intermediate parity bits; and means for checking parity of said message at said another location, said parity checking means being responsive to the information bits in said message and to the intermediate parity bits.

* * * * *